UNITED STATES PATENT OFFICE.

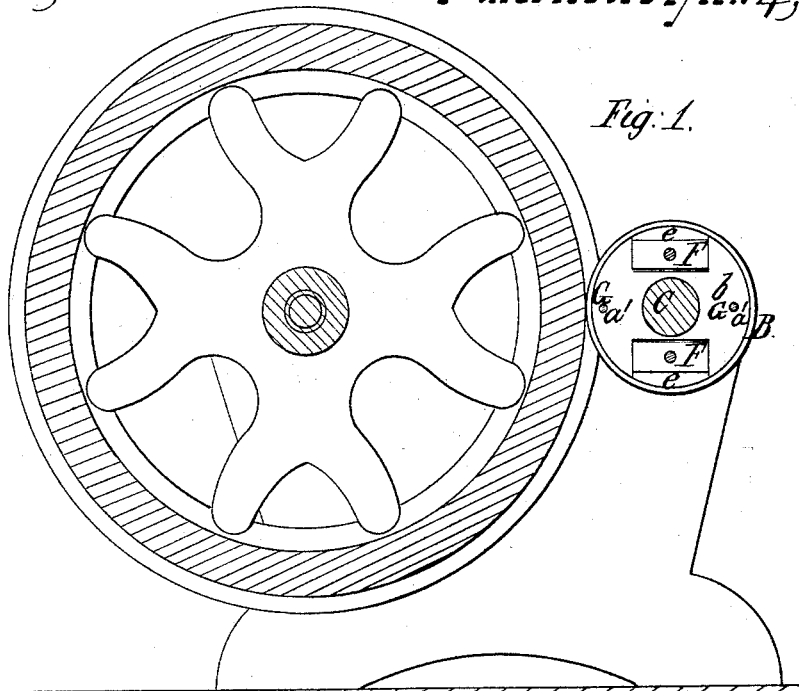
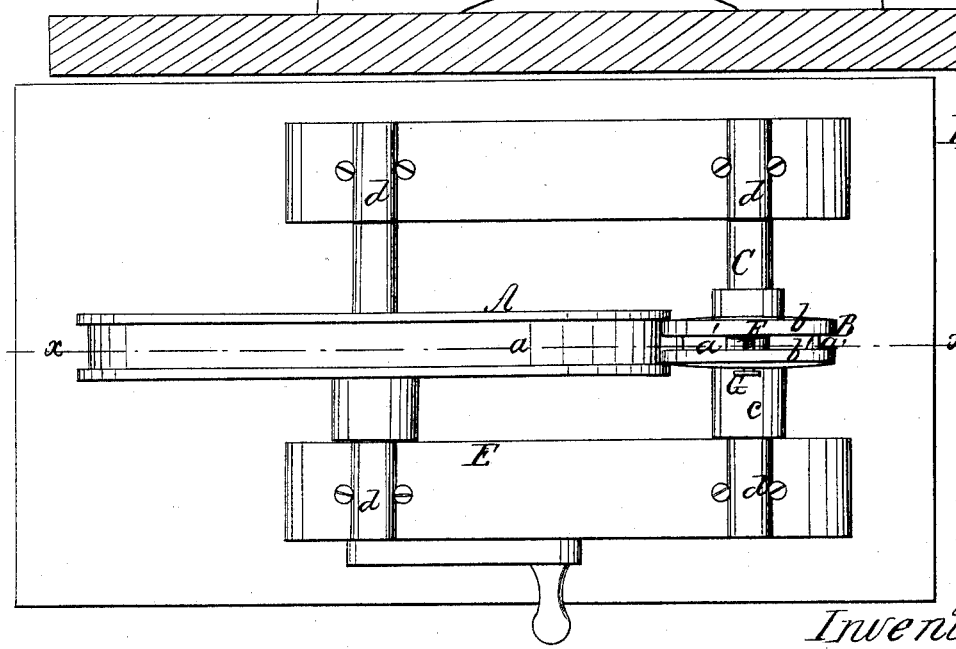

JONAS HINKLEY, OF NORWALK, OHIO.

IMPROVEMENT IN FRICTION-WHEELS FOR DRIVING MACHINERY.

Specification forming part of Letters Patent No. 38,165, dated April 14, 1863.

*To all whom it may concern:*

Be it known that I, JONAS HINKLEY, of Norwalk, in the county of Huron and State of Ohio, have invented a new and useful Improvement in Friction-Wheels for Driving Machinery; and I do hereby declare that the following is a full, clear, and exact description of the same, reference being had to the accompanying drawings, making a part of this specification, in which—

Figure 1 is a side sectional view of my invention, taken in the line $x$ $x$, Fig. 2; Fig. 2, a plan or top view of the same.

Similar letters of reference indicate corresponding parts in the several figures.

This invention consists in the employment or use of a grooved driving-wheel in connection with an expanding-wheel arranged in such a manner that it will pass against the sides of the groove in the driving-wheel and create sufficient friction to cause the rotation of the expanding-wheel, the latter being so constructed as to be capable of being adjusted to regulate the pressure or friction, as may be required.

To enable those skilled in the art to fully understand and construct my invention, I will proceed to describe it.

A represents a wheel, which may be termed the "driving-wheel," the same being of any suitable or required diameter, and having its periphery grooved, as shown at $a$, the sides of said groove being at right angles, or nearly so, with its bottom. (See Fig. 2.)

B represents a wheel considerably smaller in diameter than A, and formed of two parts, $b$ $b'$. The part $b$ is permanently attached or firmly keyed to the shaft C, but the other part, $b'$, is fitted loosely on said shaft, and is provided with a hub or collar, $c$, in order to give it a proper bearing on its shaft. The shaft C of the wheel B, as well as the shaft D of the wheel A, works in permanent bearings $d$ in a suitable framing, E. The inner surface of the part $b$ of the wheel B has two recesses, $e$ $e$, made in it at opposite sides of its center or shaft C, and in these recesses springs F F are fitted, one in each. These springs may be constructed in any proper way, strips of steel or other suitable metal, curved so as to be of semi-elliptic form, will probably answer a good purpose for springs. The part $b$ of the wheel B also has two pins, $a'$, projecting from it at right angles and at opposite sides of the shaft C, said pins being each midway between the springs F, as shown in Fig. 1. The part $b'$ of the wheel B has two screws, G G, passing through at such points that they will bear against the springs F F; and said part $b'$ also has two holes made through it to receive the pins $a'$, the latter serving as guides for the part $b'$. The wheels A B have such a relative position with each other that the edges of the parts $b$ $b'$ of the wheel B will fit in the groove $a$ of the wheel A. The springs F F cause the parts $b$ $b'$ to bear with a requisite degree of pressure against the sides of the groove $a$ so as to insure the rotation of B from A. This pressure may be regulated as required by adjusting the screws G G, as will be fully understood by referring to Fig. 2. As the screws G are screwed inward or turned from left to right, the springs F will be compressed, and the part $b$ $b'$ made to bear with a greater pressure against the sides of the groove $a$ of the wheel A.

By this invention it will be seen that the journals of the shafts C D of the wheels B A will not be subjected to any pressure, as is the case in other friction-wheel devices where the peripheries of the wheels are pressed together in contact, and the facility with which the pressure of the wheel B on A may be graduated, forms an essential feature of the invention, as all undue friction is avoided, only that which is required to insure the rotation of B being created. The device also operates with but little loss of power by friction, and runs smoothly and well.

Any number of pairs of wheels may be arranged to operate in conjunction in this way, as circumstances may require.

Having thus described my invention, what I claim as new, and desire to secure by Letters Patent, is—

The wheel A, having a grooved periphery, $a$, in combination with the wheel B, formed of a fixed part, $b$, and a sliding part, $b'$, provided, respectively, with the springs F F and screws G, and arranged to operate in connection with wheel A, as and for the purpose herein set forth.

JONAS HINKLEY.

Witnesses:
 E. A. PRAY,
 I. S. COE.